Dec. 24, 1935.  J. A. WATSON  2,025,223
LUBRICATING DEVICE AND METHOD OF MAKING THE SAME
Filed Sept. 17, 1931
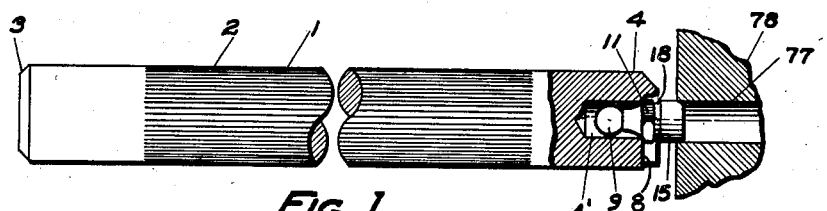
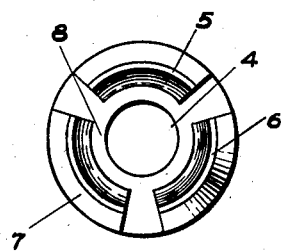
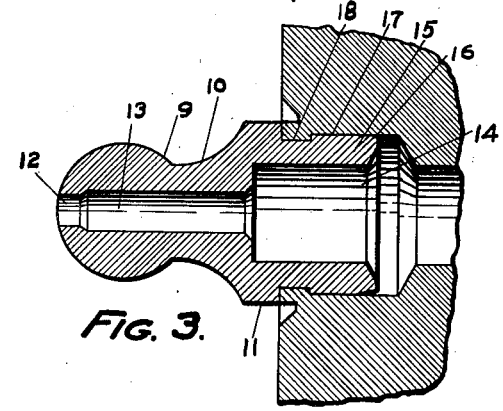
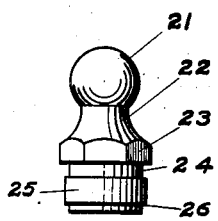
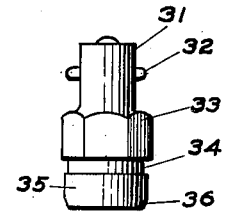
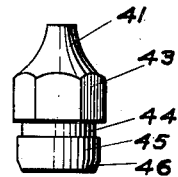
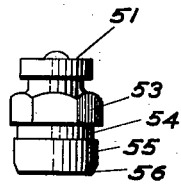
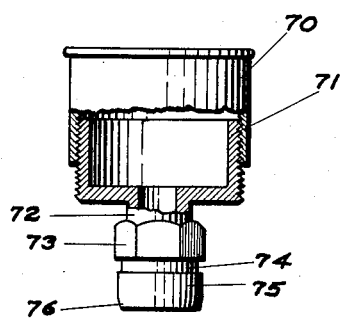
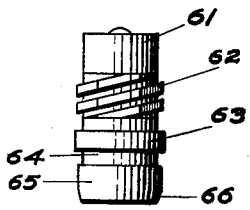
INVENTOR.
John A. Watson Patented Dec. 24, 1935

2,025,223

UNITED STATES PATENT OFFICE 2,025,223

LUBRICATING DEVICE AND METHOD OF MAKING THE SAME

John A. Watson, South Bend, Ind., assignor to The Lubrication Corporation, South Bend, Ind., a corporation of Delaware Application September 17, 1931, Serial No. 563,416

10 Claims. (Cl. 29—157)

This invention relates to lubrication devices. More particularly it is concerned with fittings or nipples adapted to be attached to bearings and the like for lubrication purposes, with a combined fitting or nipple and structure in which the fitting is secured, and with processes for securing the fittings or nipples in operative relationship with and to the bearing or other fitting carrying member.

One of the objects of the invention is to provide new and improved fittings of the character indicated.

A further object is to provide a simple and inexpensive, but nevertheless efficient, method of securing such fittings in proper relationship with the bearings to be lubricated.

A further object is to fasten fittings securely within associated structure combining the fitting and the structure in a new and improved manner.

Further objects will be or should become apparent after a reading of the subjoined specification and claims and after viewing the drawing, in which:

Fig. 1 is a view partly in elevation and partly in section showing a tool by which one of my improved fittings can be driven into a metal or other supporting member or structure in such a way that it will be securely associated in proper relationship with a bearing or the like which is to be lubricated;

Fig. 2 is a view in end elevation of the tool of Fig. 1 shown on a slightly enlarged scale;

Fig. 3 is a view in vertical section of a fitting constructed according to my invention;

Fig. 4 is a view in elevation on a reduced scale of a different type of fitting which is, nevertheless, in many respects similar to the fitting shown in Fig. 3;

Fig. 5 is a view similar to Fig. 4 showing a still different type of fitting;

Fig. 6 is a view in elevation similar to Fig. 4 of another different type of fitting;

Fig. 7 is a view similar to Fig. 4 of still another type of fitting;

Fig. 8 is a view in elevation of a still different form of fitting; and

Fig. 9 is a view in elevation of a grease cup to which my invention, in one form, has been applied.

Each of the fittings, as well as the grease cup illustrated, is adapted to be driven, pressed or otherwise forced into a bore leading to an associated bearing, although it should be understood that initially the bore may be slightly larger than the shank portion of the fitting but it is preferable that the clearance be not so great that the fitting will wobble in the bore. The tool preferably used for this driving operation is so constructed that it swages or upsets portions of the metal adjacent to the bore and causes these portions to be moved into a recess or recesses formed in the side of the fitting. Thus the fitting becomes locked in place through a simple driving operation and it is relatively inexpensive to assemble the fitting with its bearing.

Viewing Fig. 1, a driving tool 1 has a knurled body 2, a driving head 3 and a driven head 4 in which a central bore 4' is formed for the reception of the head of a fitting which is to be driven in by the tool. Adjacent to and concentrically about the bore 4' at the extreme end of the driven head 4 are a plurality (three as shown) of projections 5, 6, and 7. These projections are so shaped that when they are driven against the metal of the member into which the fitting is being secured, they displace, work, or upset the metal of the member toward the fitting, wedging the metal thereagainst. Intermediate the projections 5, 6, and 7, the tool is formed with an annular driving seat 8 which rests upon a shoulder of the fitting and forces the fitting into a bore associated with the bearing.

In Fig. 3 the invention is shown applied to a ball head type of fitting such as that disclosed in Morris Reissue Patent No. 18,123, this being the preferred form of fitting. This fitting is formed with a ball head 9, a reduced neck portion 10, an enlarged wrench receiving portion 11, which forms a drive shoulder, and a plurality of concentric bores such as 12, 13, and 14. The shank 15 is so formed that it may easily be driven into the bore in the bearing or other structure and may be locked therein instead of providing it with threads for screwing into the bore. A tapered portion 16 on the shank serves as a starting shoulder or wedge by which the fitting may be easily started and guided into the bore, while a cylindrical surface 17 preferably tightly fits the bore and makes a lubricant tight seal therewith, and an annular recess 18 intermediate the portions 11 and 16 receives the metal displaced by the projections 5, 6, and 7 of the tool and locks the fitting in the bore.

In Fig. 4 is shown another form of the invention applied to a fitting of the Morris type. Therein the ball head 21, the neck portion 22, the wrench receiving portion or drive shoulder 23 are similar to the corresponding parts shown in Fig. 3, the recess 24 corresponds to the recess 18 and the cylindrical portion 25 corresponds to the cylindrical portion 17. However, instead of forming the lower end of the shank with a tapered portion such as 16, this embodiment is provided with a starting end of reduced size formed by an abrupt shoulder 26.

In Fig. 5 I have shown a "pin" type of fitting having a head 31, a coupling pin 32, a wrench receiving portion and drive shoulder 33, an annular depression 34, a cylindrical portion 35, and a tapered starting end portion 36. The portions 34, 35, and 36 correspond to the portions 18, 17, and 16, respectively shown in Fig. 3. In Fig. 6 I have shown a "push" type fitting having a head 41, a wrench receiving portion and drive shoulder 43, an annular depression 44, a cylindrical portion 45, and a beveled portion 46, all corresponding to similar portions shown in Figs. 3 and 5. In Fig. 7 I have shown a fitting having a "button" head 51, a wrench receiving portion and drive shoulder 53, an annular depression 54, a cylindrical portion 55 and a beveled portion 56, all corresponding to parts similarly described in connection with Figs. 3, 5, and 6. In Fig. 8 I have shown a "screw" type fitting wherein there is provided a head 61, a threaded portion 62 by which a coupler may be attached to the fitting, a shoulder 63, an annular depression 64, a cylindrical portion 65, and a tapered portion 66. In Fig. 9 I have shown a fitting equipped with a reservoir or grease cup. Therein the cup 70 is adapted to be screwed upon a lubricant receiving tube 71 which is reduced as at 72 and thereafter passes down into a wrench receiving portion and drive shoulder 73 adjacent to an annular depression 74. There is also provided a cylindrical portion 75 and a tapered portion 76.

In assembling one of the described fittings with a bearing to be lubricated according to my preferred method, the fitting is positioned with the beveled portion or starting shoulder (16, 26, 36, 46, 56, 66, or 76) inserted in the bore 77 of the bearing or other member 78 that is to receive and hold the fitting. The tool 2 is then positioned over the fitting so that the upper end of the fitting (part 9, 21, 31, 41, 51, 61, or 71) is in the bore 4 and so that the drive seat 8 is in contact with the drive shoulder (part 11, 23, 33, 43, 53, 63, or 73). If preferred, the fitting may first be disposed in the tool. In either case a blow with a hammer or other suitable instrument upon the head 3 of the tool 2, forces the shank of the fitting into the bore 77, and as the projections 5, 6, and 7 come into contact with the metal about the bore in the part or receiving member 78, the metal is forced into the annular depression (depression 18, 24, 34, 44, 54, 64, or 74) thus securing the fitting in the bore.

A tool with side slots for reception of the projecting pins should be used in securing the fitting shown in Fig. 5, while in assembling the fitting shown in Fig. 9 with a bearing to be lubricated, it is necessary to use a still different type of tool. Since the reservoir is considerably larger than the driving shoulder on the portion 73, it is necessary to provide the tool with a side opening adapted to receive the lubricant tube 72, while clearing the reservoir or cup 70, 71 with relatively long downwardly extending prongs (preferably two, one on each side) adapted to swage the metal into the depression 73, and with a drive seat adapted to contact with the shoulder 73. The reservoir 70, 71 and the tube 72 may be inserted in the side opening and the fitting driven into place in a manner similar to that described above in connection with the other fittings shown and described.

As shown in Figs. 1 and 2, the preferred form of tool is provided with three projections, each of which has a tapered but fairly blunt end for swaging, displacing or flowing the metal into the depression of the fitting. However, the projections may be formed with tapering inner instead of outer sides to effect similar results. The ends of the projections 5, 6, and 7 (when the fitting is in the tool) extend slightly beyond that end of the shoulder 11 that is adjacent the groove or recess 18, but the distance which these projections extend beyond said inner end need not be great, for .010 of an inch has been found to be sufficient.

Preferably I use a tool of the character disclosed herein inasmuch as thereby I minimize the possibility of injuring the shoulder of the fitting, and moreover steel fittings which have not been hardened may be driven in as readily as those which have been hardened. While I prefer to make the fittings of hard metal such as steel, in those cases where the fitting is made of relatively soft metal such as brass, it may be found desirable to make the bore in the receiving member a light friction fit and it may not be necessary to groove the fitting shank because the harder metal of the member into which the fitting is driven may be upset or swaged into the shank of the fitting in which event the metal of the shank will be indented and the metal of the receiving member will be embedded in the metal of the fitting. I have illustrated the depression in all cases as an annular groove or notch surrounding the fitting and of substantially rectangular cross-section. While the above is the preferred form, it is recognized that my improved method can be practiced with fittings having differently formed depressions.

Thus, a fitting having a shank formed with screw threads could be locked in a bore according to my improved method. In order so to lock such a fitting, the bore 77 should be of a diameter substantially equal to the over-all diameter of the threaded portion of the fitting to be received therein. By swaging or distorting the metal adjacent to the bore into the helical depressions formed between the screw threads, the fitting may be locked in place without the expense of tapping the bores. Moreover in such a construction, it would be possible to remove the fitting by an unscrewing operation. In some cases the groove need not be annular, but may take the form of spaced depressions; also there may be several annular grooves.

It is to be noted that in assembling the fittings with parts into which they are to be secured, the latter part of the driving or inserting action is accompanied by a simultaneous swaging, distorting or upsetting of the receiving member about its bore into the groove in the fitting.

It is to be understood that the above described embodiments of the invention are for the purpose of illustration only as various changes may be made therein without departing from the spirit and scope of the invention.

I claim:

1. In combination, a fitting receiving member having a fitting receiving opening provided with a relatively smooth bore, a fitting having a lubricant channel therethrough, said fitting having an end disposed in said bore, and means positioned at spaced places about the center of the opening and displaced from the marginal edges of said member about said bore into frictional engagement with said fitting end for securing the fitting and member together.

2. In combination, a fitting receiving member having a fitting receiving opening therein said fitting receiving opening having a relatively smooth bore, a fitting having a lubricant channel therethrough, said fitting having an end portion disposed within said bore, said end portion having an upwardly facing shoulder thereon, and means displaced from marginal edges of said receiving member about said bore against and over said upwardly facing shoulder for securing said fitting and member together.

3. The method of securing a lubrication drive fitting having an integral shank and a groove in the shank in a bore in a member such as a bearing and the like comprising, driving the fitting shank into the bore, deforming a portion of said member about said bore and flowing some of said deformed portion into said groove through the application of a stress independent of stress due to driving the said shank into said bore.

4. The method of securing a lubrication fitting within a bore formed in a metal body comprising, forming a groove in the shank of the fitting, inserting the fitting shank in said bore with an inwardly facing surface adapted to be exposed to the pressure of the fluid within said bore, and displacing portions of the metal of the body therefrom into interlocking engagement with the groove of said fitting shank to retain said shank in said bore against the action of lubricant pressure on said surface tending to force the fitting from said bore.

5. The method of securing a lubrication fitting within a bore in a metal body comprising, driving into said bore a fitting provided with a lubricant receiving channel adapted to receive a lubricant under pressure and having a surface which is subjected to the pressure of the lubricant acting axially of the fitting and an external pre-formed depression to be located within the bore, and swaging portions of the metal of the body into said pre-formed depression in the fitting to retain said fitting in said bore against the action of pressure of said lubricant acting axially on said surface and tending to force the fitting out of said bore.

6. The method of securing a lubrication fitting within a bore in a metal body comprising, providing a fitting having a surface which is subjected to the pressure of the lubricant acting axially of the fitting and an external lateral depression in that portion of the fitting which is adapted to be received within the bore, driving the fitting into the bore, and simultaneously displacing portions of the metal of the body into the depression in the fitting to retain said fitting in said bore against displacement by the pressure of the lubricant acting axially on said surface and tending to force the fitting out of said bore.

7. The combination with a member having a bore for the reception of a lubrication fitting shank therein, of a fitting having a shank portion disposed in said bore and having at least one surface subjected to the pressure of the lubricant acting axially of the fitting and tending to urge the fitting from the bore, and means for securing said fitting against displacement from said bore by the pressure of the lubricant acting on said surface comprising, a circumferentially extending groove in the shank of said fitting and a projection displaced inwardly from the wall of said bore into interlocking engagement with said groove.

8. In combination, a member having an opening to receive a lubrication fitting, a fitting having a lubricant channel extending therethrough, said fitting having a shank disposed in said opening and a portion which is subjected to the pressure of the lubricant acting axially of said fitting and said shank being provided with an external outwardly facing shoulder, and means for retaining said shank in said opening against displacement therefrom under the pressure of the lubricant being forced through said channel and acting on said portion with a tendency to force said fitting from said opening comprising, means displaced inwardly from the wall of said opening over and into interlocking engagement with said shoulder.

9. A drive type lubrication fitting comprising, a body having a lubricant passage therethrough, one end of said body being adapted for reception within a recess in a fitting receiving member and said fitting having a transverse area which is subjected to the pressure of the lubricant acting in the direction of the axis of said fitting, and means for retaining said fitting in said recess against the action of the pressure of the lubricant including a circumferentially extending depression in that portion of said body that is adapted to enter said recess and interlock with metal displaced inwardly from the wall of said recess to restrain said fitting against displacement from said recess.

10. A drive type lubrication fitting comprising, a body having a lubricant passage therethrough, one end of said body being adapted for reception within a recess in a fitting receiving member and said fitting having a transverse area which is subjected to the pressure of the lubricant acting in the direction of the axis of said fitting, and means for retaining said fitting in said recess against the action of the pressure of the lubricant including a shoulder facing outwardly of the recess and extending at least partially around said body and adapted to enter said recess, said shoulder being adapted to be interlocked with metal displaced inwardly thereover from the wall of said recess.

JOHN A. WATSON.